April 17, 1934.                L. G. POOLER                1,955,471
                     POLYPHASE CONVERTER GENERATOR
                          Filed Aug. 13, 1931
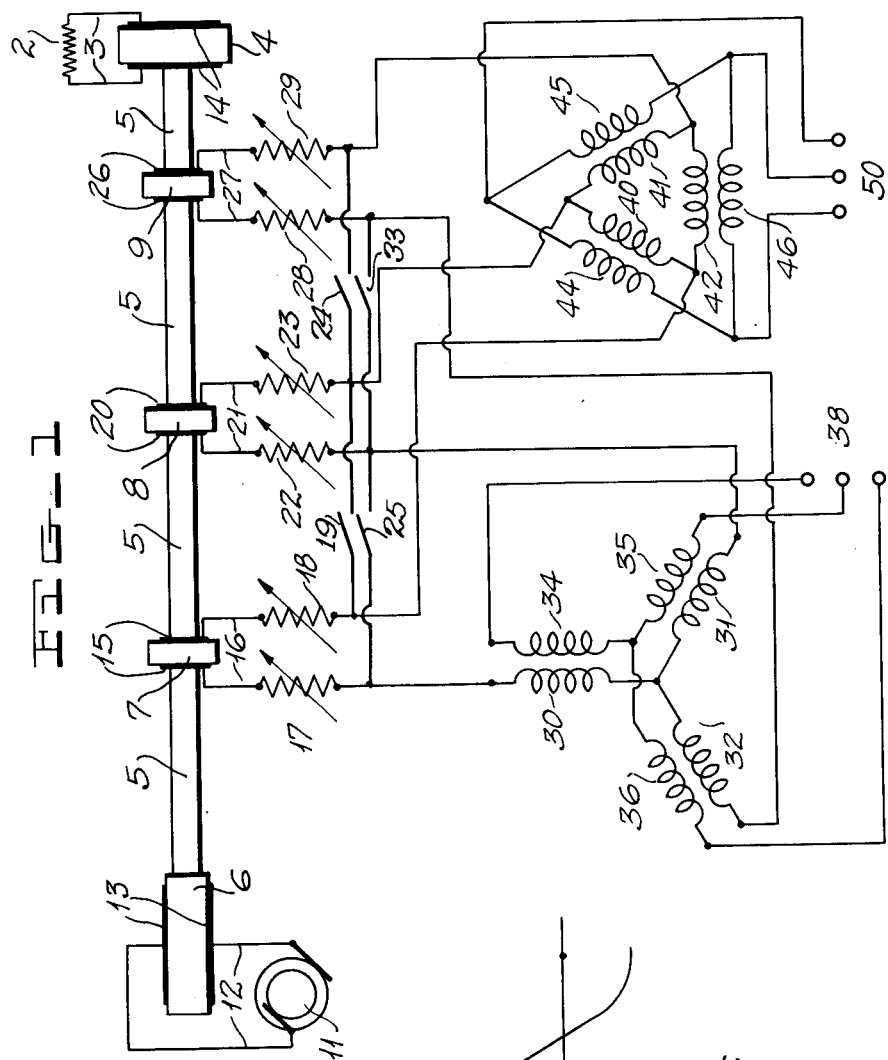
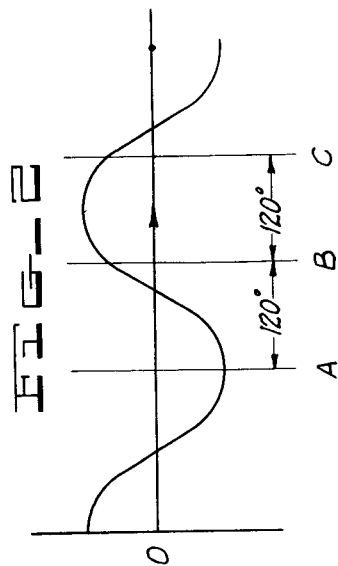
INVENTOR
Louis G. Pooler
BY
ATTORNEY Patented Apr. 17, 1934

1,955,471

UNITED STATES PATENT OFFICE 1,955,471

POLYPHASE CONVERTER-GENERATOR

Louis G. Pooler, New York, N. Y., assignor to Communication Patents, Inc., New York, N. Y., a corporation of Delaware Application August 13, 1931, Serial No. 556,725

12 Claims. (Cl. 172—238)

This invention relates to the generation of electrical currents, and particularly to the generation of polyphase currents having various degrees of phase displacement between them.

It is well known in the art that three conductors may have three voltages generated therein having maximum amplitudes 120° apart with the sum of the voltages at any particular instant equal to zero. This is called a three phase system. It is also well known in the art how such voltages and currents may be generated with a mechanical generator having three equally spaced windings upon a stator or rotor, with a triangular vacuum tube arrangement or with a quadrature driven crystal. These methods are also applicable to generate voltages and currents having any desired number of phases, the usual arrangement, however, being a three phase system.

An object of this invention is to generate plural phase voltages and currents from a single phase source.

Another object of the invention is to generate plural phase voltages and currents from a travelling wave produced in a vibrating element or medium.

A further object of the invention is to generate three-phase voltages or currents from piezoelectric crystals spatially disposed in a vibrating medium.

The invention, in brief, is the provision of a vibrating element of material such as fused quartz, steel or any suitable isotropic homogeneous material in which a travelling wave may be propagated uniformly and with equal attenuation in all parts and in all directions. This structure may be in the form of a sectional elongated rod or bar which may be excited at one or several positions, preferably, at one end thereof, by an exciter such as a piezoelectric element. The actuation of the rod element creates a compressional wave which is propagated therethrough. This wave is propagated through the rod until it reaches a point where it is absorbed and not reflected. The length of this wave is dependent upon the frequency of the exciting source and the velocity of propagation.

Positioned between the sections of the vibrating element are piezoelectric devices which will have created on their surfaces potential differences. These potential differences will be created by the compressional travelling wave, and will have an instantaneous value in accordance with the amplitude of this wave. The piezoelectric devices may be placed, therefore along the vibratile element so as to have voltages produced thereon in any desired phase relationship with respect to one another. With a 120° displacement between zero points of three generated potentials in a three conductor circuit, the usual three-phase system is created.

The invention will be more fully understood from the following description taken in conjunction with the accompanying drawing, in which:—

Fig. 1 shows a schematic circuit of one embodiment of the generating system; and Fig. 2 is a diagram of the travelling wave produced in the generating medium of Fig. 1.

Referring to Fig. 1, a rod 5 of four separate sections has attached at the ends of the terminal sections piezoelectric crystals 4 and 6, and disposed between sections, crystal elements 7, 8 and 9. These elements are, preferably, of piezoelectric quartz, the rod sections being of fused quartz, although a rod of high quality steel may be used. The elements 7, 8 and 9 are shown smaller than the elements 4 and 6, but the size of these elements depends entirely upon the cross section of the rod 5 and the dimensions of the elements 4 and 6. The cross section of the rod 5 may be of any convenient shape such as round, square, or elliptical.

A single phase source 11 supplies over conductors 12 energy to the crystal 6 through the electrodes 13, producing an electrostatic field in which the crystal is deformed in the well known manner. The crystals 4 and 6 may be attached to the fused quartz rod 5 either by melted shellac or other suitable cement, although any fastening which is durable and permits the transmission of the compressional waves from the crystal 6 through the rod to the crystal 4 with the least distortion may be employed. The electrodes 13 of the crystal 6 and electrodes 14 of crystal 4 may be silvered upon the crystals or abutted against the crystal faces in any suitable type of crystal holder. The silvered type of electrodes are preferably for the elements 7, 8 and 9, however, the electrodes being interposed between the rod portions and the crystals. Conductors 3 from the electrodes 14 are shunted with an impedance 2 which has a value substantially equal to the mechanical surge impedance of the vibrating system, in order to obtain substantially total absorption.

On the crystal element 7 are electrodes 15 from which extend conductors 16 including variable resistances 17 and 18. From electrodes 20 on the crystal element 8 extend conductors 21 in which are disposed variable resistances 22 and 23. Likewise on the crystal element 9 are electrodes 26 from which extend conductors 27 with variable resistances 28 and 29 connected therein. From the variable resistances 17, 22 and 28 extend conductors which connect with the primaries 30, 31 and 32, respectively, of a star connected transformer system. This transformer system has respective secondaries 34, 35 and 36 terminating at 38 for connection to any type of three phase work circuit. The currents at the output terminals 38 may be amplified to a value suitable for the purpose required.

From the variable resistance 18, 23 and 29 extend conductors which terminate in primaries 40, 41 and 42 of a delta connected transformer system having respective secondaries 44, 45 and 46. These secondaries have terminals 50 to be connected to any desired work circuit. The star and delta connected transformers are shown to illustrate that the potentials derived from the crystals 7, 8 and 9 may be transmitted in either of the well known manners depending upon the nature of the load. When using the star connections, switches 19 and 24 are closed and when using the delta circuit, switches 35 and 33 are closed, any two conductors of each circuit forming the return path for the third phase.

Referring to Fig. 2 a travelling wave is illustrated which is produced at the point O by the crystal 6. The wave is produced with its greatest amplitude at the left end of the rod 5 and is propagated therethrough and through the crystals 7, 8 and 9 as a compressional wave to the crystal 4. As the wave reaches the crystal 4, the energy in the wave is absorbed, thus preventing reflections, and the production of standing waves.

The first crystal generating element 7 may be positioned at any point with respect to the driving crystal 6, but the elements 8 and 9 must be positioned 120° and 240° from crystal 7, respectively, if three phase currents are to be obtained. As shown in Fig. 2 the three elements 7, 8 and 9 are positioned at points A, B and C respectively, the wave travelling in the direction shown by the arrow head. The amplitudes of the vibrations or the pressure applied to the respective crystals is proportional to the amplitude of the wave which is substantially the same for all generating elements but because of non-uniform generating qualities of the crystals, the variable resistances 17, 18, 22, 23, 28 and 29 are employed. Also because of molecular friction and other factors, such as nonuniformity of the propagating medium or changes in temperature in different portions thereof, certain changes in amplitude will be experienced by the wave as it is propagated along the rod and through the crystals. The resistances are used, therefore, to equalize the voltages at the terminals of the primaries of the output transformers. It is to be understood that the crystals may be inserted in the vibratile system at any number of similarly spaced points for three phase generation. From the arrangement illustrated in Fig. 1 two complete three phase supplies are obtained, each of which will bear to the other a phase difference of 180°. All the polarities of one sign generated from the crystals are connected to the star transformer system, and are, therefore, 180° out of phase with the potentials of opposite sign produced in the delta connected system.

The position of the generating elements 7, 8 and 9 can be computed from the known value of the velocity of propagation of longitudinal waves in the medium of the rod and of the piezoelectric crystals. It is to be understood of course, that the crystal generators and the mechanical connecting materials should be preferably of the same homogeneity, and have like propagation constants.

The above arrangement has been shown for the generation of three phase current, but it is obvious to those skilled in the art that by the use of more generating crystals, any number of phases may be obtained. Furthermore, that by the positioning of the crystals along the rod, any phase relationship may be obtained between the various generated potentials. It has been found that a round rod of fused quartz having a diameter of ½" requires an extremely small amount of energy to produce sustained oscillations therein, and that the homogeneity of the material is well adapted for the production of travelling waves of a uniform character, and that the attenuation of compressional waves therethrough is comparatively small.

Although the invention has been disclosed in its preferred embodiment, it is to be understood that other uses will occur to those skilled in the art, and that the invention is to be limited only by the scope of the appended claims.

What is claimed is:

1. In an electrical current generator, a plurality of elongated vibratile members, piezoelectric crystal elements positioned between said members in series in a single unit, means for creating a continuous train of waves in said members, and means attached to said crystal elements for utilizing the generated voltages produced by said compressional wave.

2. In an electrical current generating system, a plurality of piezoelectric crystal generators spatially disposed, an isotropic homogeneous medium mechanically connecting said crystals, means for exciting said crystals with a travelling wave, means for absorbing said wave, and means for combining the voltages generated on the faces of said crystals during vibrations thereof.

3. In an electrical current generating system, a piezoelectric element, an elongated vibratile member connected to said element, means for resonating said piezoelectric element at a definite frequency, the vibrations of said element being propagated through said member as a travelling wave, means at the output terminal of said member for absorbing said vibrations, and means spatially disposed along said member for generating plural phased voltages having an amplitude in accordance with the amplitude of the vibrations in said member.

4. In an electrical current generating system, a plurality of mechanically connected piezoelectric crystals arranged in series, means for resonating one of said crystals at a definite frequency to create a travelling wave, means for absorbing said travelling wave after it has passed through said crystals, and means for detecting the generated potentials on the faces of other of said crystals.

5. The method of generating plural phased electrical currents from piezoelectric elements positioned along a wave propagating medium comprising generating a travelling wave through said elements, voltages being generated on said elements in accordance with their disposition along said medium.

6. The method of generating three phase electrical currents from piezoelectric elements positioned in a wave propagating medium in a 120° displacement comprising generating a travelling wave in said medium.

7. In a three-phase electrical current generator, a plurality of elongated vibratile members, three piezoelectric elements equally spaced and joining said members, circuit connections from said piezoelectric elements forming three conductor circuits, means for generating in the said vibratile members and said elements a travelling wave of definite frequency, and means for absorbing said wave.

8. In an electrical converter-generator, a vibratile medium, a plurality of electrical voltage generators arranged substantially in a line in said medium, means for exciting said medium for setting up a train of waves which successively affects said generators, and means for obtaining voltages generated by said generators.

9. The method of converting single phase current into polyphase current which comprises arranging a plurality of piezo-electric crystals substantially in line in an elastic medium and at a distance corresponding to the phase of the current it is desired to generate and exciting one of said crystals, thereby setting up a train of waves which successively affects the other crystals.

10. The method of converting single phase energy into three phase energy which comprises arranging three piezo-electric crystals substantially in a line in an elastic medium at 120° displacement, and exciting one of said crystals thereby setting up a train of waves which successively affects the other crystals.

11. In a three phase electrical converter-generator, an elastic medium, a plurality of electrical current generators positioned substantially in line in said medium and at 120° displacement, means for generating a train of waves which successively affects said generators, and means for connecting said generators in a three phase circuit.

12. In an electrical generator, an elastic medium, a plurality of electrical voltage generators arranged substantially in line in said medium and at a distance corresponding to the phase of the voltage it is desired to generate, and means for generating a train of waves for affecting said generators, said generators producing voltages in a phase corresponding to the time said train of waves reaches them in accordance with their positions in said medium.

LOUIS G. POOLER.